United States Patent
Choi et al.

(10) Patent No.: US 8,148,008 B2
(45) Date of Patent: Apr. 3, 2012

(54) NEGATIVE ACTIVE MATERIAL COMPOSITION FOR A RECHARGEABLE LITHIUM BATTERY, A NEGATIVE ELECTRODE FOR A RECHARGEABLE LITHIUM BATTERY, AND A RECHARGEABLE LITHIUM BATTERY INCLUDING SAME

(75) Inventors: Nam-Soon Choi, Yongin-si (KR);
Sung-Soo Kim, Yongin-si (KR);
Goo-Jin Jeong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 165 days.

(21) Appl. No.: 11/998,042

(22) Filed: Nov. 27, 2007

(65) Prior Publication Data

US 2008/0131783 A1 Jun. 5, 2008

(30) Foreign Application Priority Data

Nov. 27, 2006 (KR) .................. 10-2006-0117904

(51) Int. Cl.
*H01M 4/02* (2006.01)
*H01M 4/134* (2010.01)
(52) U.S. Cl. .................. 429/209; 429/218.1
(58) Field of Classification Search ........... 429/220
See application file for complete search history.

(56) References Cited

U.S. PATENT DOCUMENTS

| | | | |
|---|---|---|---|
| 5,707,756 A * | 1/1998 | Inoue et al. | 429/57 |
| 5,824,285 A * | 10/1998 | Koksbang | 423/599 |
| 6,001,507 A | 12/1999 | Ono et al. | |
| 6,589,694 B1 * | 7/2003 | Gosho et al. | 429/231.1 |
| 6,759,164 B2 | 7/2004 | Palazzo et al. | |
| 6,797,019 B2 | 9/2004 | Takeuchi et al. | |
| 2002/0076611 A1 * | 6/2002 | Palazzo et al. | 429/217 |
| 2003/0054259 A1 * | 3/2003 | Murai et al. | 429/330 |
| 2003/0198868 A1 * | 10/2003 | Takeuchi et al. | 429/217 |
| 2004/0096773 A1 | 5/2004 | Jung et al. | |
| 2006/0099506 A1 * | 5/2006 | Krause et al. | 429/217 |
| 2007/0059604 A1 * | 3/2007 | Kim et al. | 429/234 |
| 2009/0186273 A1 * | 7/2009 | Lee et al. | 429/217 |

FOREIGN PATENT DOCUMENTS

| | | |
|---|---|---|
| EP | 1246280 A2 | 10/2002 |
| EP | 1246280 A3 | 6/2006 |
| JP | 06-275279 | 9/1994 |

(Continued)

OTHER PUBLICATIONS

European Search Report dated Mar. 6, 2008 for European Application 07121271.6, indicating relevance of references listed in this IDS.

(Continued)

*Primary Examiner* — Barbara Gilliam
*Assistant Examiner* — Adam A Arciero
(74) *Attorney, Agent, or Firm* — Christie, Parker & Hale, LLP

(57) ABSTRACT

Negative active material compositions for rechargeable lithium batteries, negative electrodes for rechargeable lithium batteries, and rechargeable lithium batteries using the negative active material compositions are provided. The negative active material composition includes a negative active material, a polyimide precursor compound, and a highly flexible polymer. The negative active material composition prevents the electrode substrate from bending, thereby improving the capacity and cycle-life characteristics of the battery.

**9 Claims, 4 Drawing Sheets
(2 of 4 Drawing Sheet(s) Filed in Color)**

FOREIGN PATENT DOCUMENTS

| | | |
|---|---|---|
| JP | 10-188992 | 7/1998 |
| JP | 2000-21412 | 1/2000 |
| JP | 2002-260668 | 9/2002 |
| JP | 2002-270185 | 9/2002 |
| JP | 2004-247233 A | 9/2004 |
| KR | 2003-0047038 | 6/2003 |
| KR | 10-2005-0114698 | 12/2005 |
| WO | WO 2006/052313 A1 | 5/2006 |

OTHER PUBLICATIONS

Hradil et al., *Heterogeneous membranes based on a composite of a hypercrosslinked microparticle adsorbent and polyimide binder*, Reactive & Functional Polymers, vol. 67, No. 5, Apr. 29, 2007, pp. 432-441, XP022051899.

Ohta et al., *A novel binder for the graphite anode of rechargeable lithium ion batteries for the improvement of reversible capacity*, Letters to the Editor/Carbon, vol. 39, No. 9, Aug. 2001, pp. 1434-1436, XP004319992.

Popova et al., *Heat-resistant foamed organoplastics based on a combination of polyimide felt, polyimide binders, and montmorillonite nanoparticles*, Russian Journal of Applied Chemistry, vol. 79, No. 3, Mar. 1, 2006, pp. 439-444, XP019406671.

Patent Abstracts of Japan, Publication No. 2004-247233, dated Sep. 2, 2004, in the name of Kazunari, Okita, et al.

Korean patent abstracts for publication No. 1020050114698 dated Dec. 6, 2005 in the name of Soichiro Kawakami et al.

Patent Abstracts of Japan, Publication No. 2000-021412, Published on Jan. 21, 2000, in the name of Katayama, et al.

Korean Patent Abstracts, Publication No. 1020030047038 A, Published on Jun. 18, 2003, in the name of Jung, et al.

Japanese Office action dated Feb. 22, 2011, for corresponding Japanese Patent application 2007-280854, noting listed references in this IDS.

Patent Abstracts of Japan, and English machine translation of Japanese Publication 06-275279, listed above, 7 pages.

\* cited by examiner

NEGATIVE ACTIVE MATERIAL COMPOSITION FOR A RECHARGEABLE LITHIUM BATTERY, A NEGATIVE ELECTRODE FOR A RECHARGEABLE LITHIUM BATTERY, AND A RECHARGEABLE LITHIUM BATTERY INCLUDING SAME

CROSS-REFERENCE TO RELATED APPLICATION

This application claims priority to and the benefit of Korean Patent Application No. 10-2006-0117904 filed in the Korean Intellectual Property Office on Nov. 27, 2006, the entire content of which is incorporated herein by reference.

BACKGROUND OF THE INVENTION

1. Field of the Invention

The present invention relates to negative active material compositions for rechargeable lithium batteries, to negative electrodes for rechargeable lithium batteries, and to rechargeable lithium batteries including the same.

2. Description of the Related Art

Lithium rechargeable batteries use materials that reversibly intercalate or deintercalate lithium ions during charge and discharge reactions for both positive and negative active materials. Lithium rechargeable batteries also use organic electrolytes or polymer electrolytes between the positive electrodes and the negative electrodes.

Lithium rechargeable batteries generate electrical energy from oxidation and reduction of lithium ions during intercalation and deintercalation at the positive and negative electrodes. Such rechargeable lithium batteries have high cell voltages and large energy densities due to the high standard electrochemical potential of lithium ions.

Lithium-transition element oxides have been used as the positive active material of rechargeable lithium batteries. Crystalline or amorphous carbon or carbon composites have been used as the negative active material.

Each of the positive and negative active materials is coated on a current collector at an appropriate thickness and length to fabricate positive and negative electrodes. Alternatively, each of the positive and negative active materials is formed into a film to fabricate positive and negative electrodes. The positive and negative electrodes and a separator positioned between the positive and negative electrodes are then wound or stacked to fabricate an electrode assembly. The electrode assembly is placed in a can or other case and an electrolyte solution is injected therein to fabricate a prismatic rechargeable battery.

Generally, the negative electrode for a rechargeable lithium battery is fabricated by mixing a negative active material, a binder, and optionally a conductive agent to prepare a negative active material composition, and coating the negative active material composition on a current collector to form a negative electrode.

Polyimide has good adhesion characteristics and shape stability at high temperatures, and therefore can be used as the binder for the negative electrode of a rechargeable lithium battery requiring stability at high temperatures. Polyimide is not used itself, but rather a precursor of polyimide is used in the negative active material composition. Polyamic acid (which is a precursor of polyimide) is converted into polyimide during drying of the negative electrode preparation. The conversion reaction, which is a dehydration reaction, causes shrinkage of the polyimide, resulting in bending of the negative electrode. In addition, the polyimide is rigid.

SUMMARY OF THE INVENTION

In one embodiment of the present invention, a negative active material composition for a rechargeable lithium battery improves capacity and cycle-life by inhibiting electrode shrinkage.

In another embodiment of the present invention, a negative electrode is fabricated using the negative active material composition for a rechargeable lithium battery.

In yet another embodiment of the present invention, a rechargeable lithium battery includes the negative electrode.

According to one embodiment of the present invention, a negative active material composition for a rechargeable lithium battery includes a negative active material, a polyimide precursor compound, and a highly flexible polymer.

The polyimide precursor compound may be a compound produced by a condensation reaction between a first monomer and a second monomer. The first monomer may be selected from compounds represented by Formulae 1 to 4, and the second monomer may be selected from compounds represented by Formulae 5 to 9.

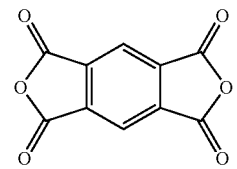

Formula 1

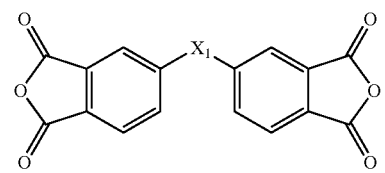

Formula 2

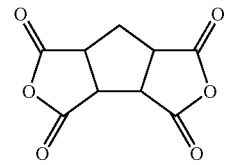

Formula 3

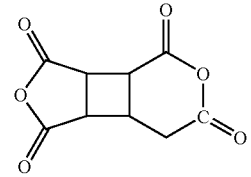

Formula 4

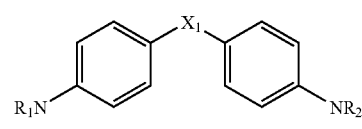

Formula 5

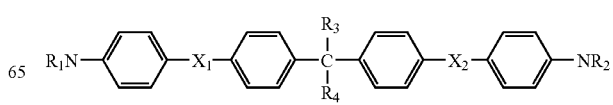

Formula 6

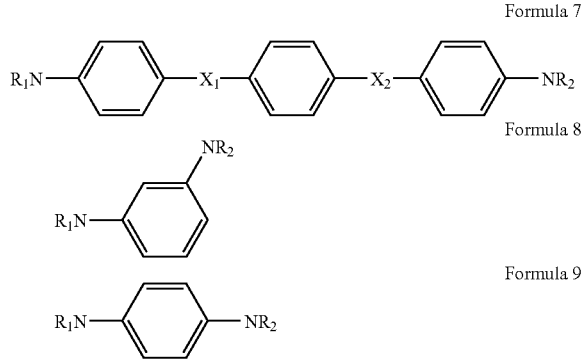

Formula 7

Formula 8

Formula 9

In Formulae 1 through 9, each of $X_1$ and $X_2$ is independently selected from O, CO, $SO_2$, or S, and $X_1$ and $X_2$ may be the same or different. Each of $R_1$ and $R_2$ is independently selected from H and alkyls, and $R_1$ and $R_2$ may be different. Each of $R_3$ and $R_4$ is independently selected from halogens, haloalkyls, alkyls, and H, and $R_3$ and $R_4$ may be the same or different.

The highly flexible polymer has a glass transition temperature of about 50° C. or less. According to one embodiment, the highly flexible polymer has a glass transition temperature ranging from about −60° C. to about 50° C.

The highly flexible polymer has a weight average molecular weight ranging from about 10,000 to about 1,000,000. According to one embodiment, the highly flexible polymer has a weight average molecular weight ranging from about 10,000 to 500,000.

The highly flexible polymer may be selected from compounds represented by Formulae 10 to 14, and combinations thereof.

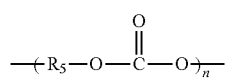

Formula 10

In Formula 10, $R_5$ is an alkylene, and n ranges from 120 to 1000.

Formula II

In Formula II, $R_6$ is an alkylene, and n ranges from 250 to 25,000.

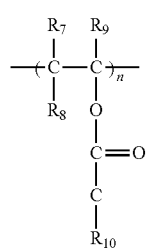

Formula 12

In Formula 12, $R_7$ to $R_{10}$ may be the same or different and each of $R_7$ to $R_{10}$ is independently selected from H and alkyls, and n ranges from 120 to 12,000.

Formula 13

In Formula 13, $R_{11}$ and $R_{12}$ may be the same or different, and each of $R_{11}$ and $R_{12}$ is independently selected from H and alkyls. $X_3$ and $X_4$ may be the same or different and each of $X_3$ and $X_4$ is independently selected from halogens, and n ranges from 150 to 10,000.

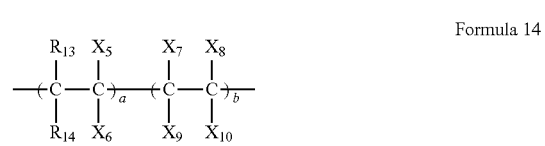

Formula 14

In Formula 14, $R_{13}$ and $R_{14}$ may be the same or different, and each of $R_{13}$ and $R_{14}$ is independently selected from H and alkyls. $X_5$ to $X_{10}$ may be the same or different, and each of $X_5$ to $X_{10}$ is independently selected from halogens, a ranges from 120 to 900, and b ranges from 5100 to 5880.

According to another embodiment of the present invention, a negative electrode includes a current collector and a negative active material layer disposed on the current collector. The negative active material layer includes a negative active material, a polyimide precursor compound, and a highly flexible polymer. The polyimide precursor compound may be a compound produced by a condensation reaction between a first monomer and a second monomer. The first monomer may be selected from compounds represented by Formulae 1 to 4, and the second monomer may be selected from compounds represented by Formulae 5 to 9.

According to yet another embodiment of the present invention, a rechargeable lithium battery includes the negative electrode, a positive electrode including a positive active material that is capable of reversibly intercalating and deintercalating lithium ions, and an electrolyte.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE INVENTION

Polyimide is generally used as a binder for lithium alloy-based batteries and is rigid. Such polyimide is not used itself, but rather a precursor of the polyimide is used in the negative active material composition. Polyamic acid, which is a precursor of polyimide, is converted into polyimide during drying of the negative electrode preparation. The conversion reaction, which is a dehydration reaction, causes shrinkage of the polyimide, resulting in bending of the negative electrode.

The bending phenomenon of the negative electrode will be illustrated in more detail.

In general, a negative electrode is prepared by mixing a polyimide precursor compound, a negative active material, and optionally a conductive agent in an organic solvent to prepare a negative active material composition. The negative active material composition is coated on a current collector and dried to form a negative active material layer.

The polyimide precursor compound undergoes a dehydration reaction in which water molecules are removed, and the precursor is thereby converted into polyimide as shown in the following Reaction Scheme 1.

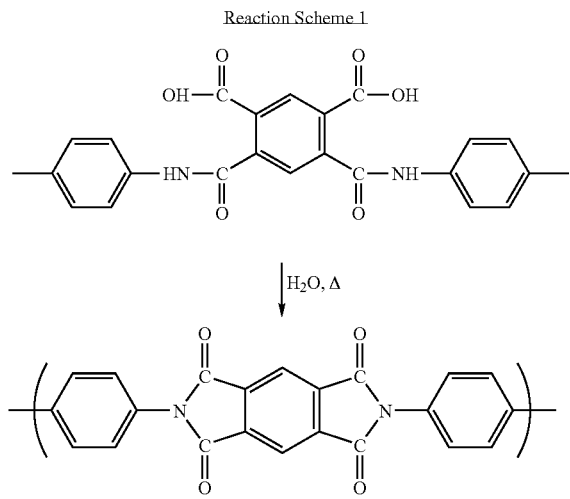

Reaction Scheme 1

Figure 1A:
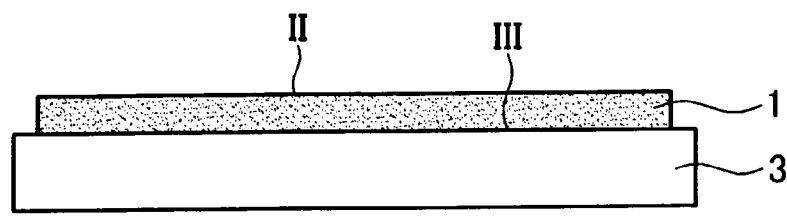
FIG. 1A is a schematic cross-sectional view of a prior art electrode of a rechargeable lithium battery illustrating contraction of the negative active material layer.
Figure 1B:
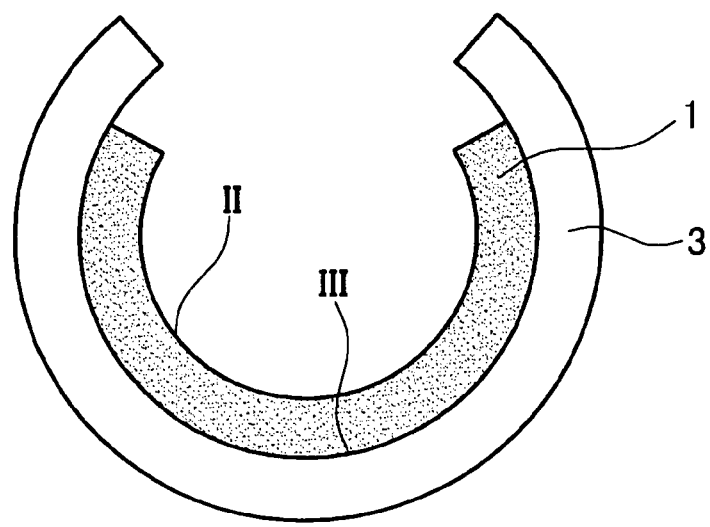
FIG. 1B is a schematic cross-sectional view of the electrode of FIG. 1A showing the bending that occurs in the prior art electrode.

The dehydration reaction creates spaces due to the removal of the water molecules, and the polyimide contracts by the same amount. The contraction of the polyimide may cause the negative active material layer to contract. As shown in FIG. 1A, the side III of the negative active material layer 1 that contacts the current collector 3 contracts to a different degree than the other side II. In other words, the side III of the negative active material layer 1 that contacts the current collector 3 contracts less than the other side II (i.e., an open surface). The side III of the negative active material layer 1 that contacts the current collector 3 is less transformed because the current collector 3 has strong surface tension. This difference in the degree of contraction causes the negative electrode to bend as shown in FIG. 1B.

When the negative electrode is bent, it is extremely difficult to coat the negative active material composition on both sides of the current collector because coating the side III after coating the side II is very difficult. As a result, the amount of negative active material is decreased, making it difficult to realize high capacity batteries.

In addition, when the bent part of the negative electrode is forcibly straightened, the negative electrode may form severe cracks on its surface, deteriorating the electrochemical characteristics of the electrode.

Furthermore, when a negative active material composition is coated in small amounts on one side of the current collector to decrease bending of the negative electrode, batteries formed therefrom may have decreased capacity.

In order to solve this problem, the present invention includes a binder prepared by blending a highly flexible polymer with polyimide. In particular, a negative active material composition for a rechargeable lithium battery according to one embodiment of the present invention contains enough of the highly flexible polymer to compensate for the volume lost from contraction of the polyimide precursor compound due to dehydration. As such, the binder may suppress bending of the negative electrode.

According to one embodiment of the present invention, a negative active material composition for a rechargeable lithium battery may include a negative active material, a polyimide precursor compound, and a highly flexible polymer.

The negative active material may be selected from lithium metal, lithium alloys, materials capable of reversibly forming lithium-containing compounds, materials capable of reversibly intercalating and deintercalating lithium ions, and combinations thereof. The lithium alloy may be an alloy including lithium and another metal selected from Na, K, Rb, Cs, Fr, Be, Mg, Ca, Sr, Ba, Ra, Al, Sn, and combinations thereof.

Nonlimiting examples of suitable materials capable of reversibly forming lithium-containing compounds may include tin oxide (SnO, $SnO_2$), titanium nitrate, silicon oxide (SiO, $SiO_x$ where $0<x<2$), silicon, and combinations thereof.

The materials capable of reversibly intercalating and deintercalating lithium may include carbon-based materials. The carbon-based materials may include amorphous carbon or crystalline carbon. The amorphous carbon may be a soft carbon (carbon obtained by sintering at a low temperature), a hard carbon (carbon obtained by sintering at a high temperature), mesophase pitch carbide, fired coke, and so on. The crystalline carbon may be non-shaped, or sheet, flake, spherical, or fiber shaped natural or artificial graphite.

The polyimide precursor compound includes a compound produced through a condensation reaction of a first monomer and a second monomer. The first monomer may be selected from compounds represented by Formulae 1 to 4, and the second monomer may be selected from compounds represented by Formulae 5 to 9.

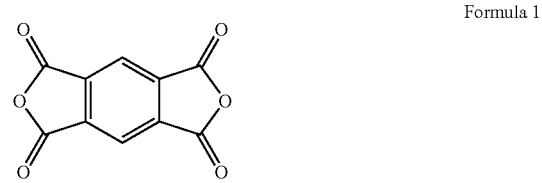

Formula 1

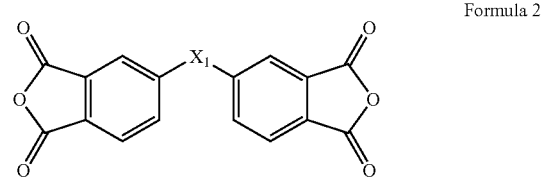

Formula 2

-continued

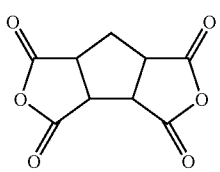

Formula 3

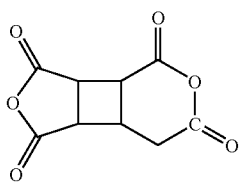

Formula 4

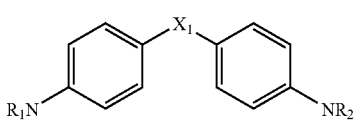

Formula 5

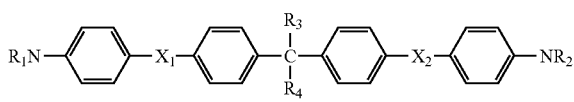

Formula 6

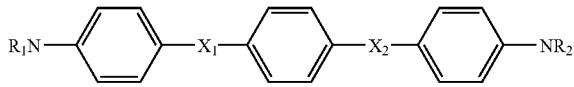

Formula 7

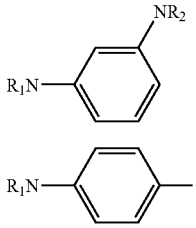

Formula 8

Formula 9

In Formulae 1 through 9, $X_1$ and $X_2$ may be the same or different and each of $X_1$ and $X_2$ is independently selected from O, CO, $SO_2$, or S. $R_1$ and $R_2$ may be the same or different and each of $R_1$ and $R_2$ is independently selected from H and alkyls. $R_3$ and $R_4$ may be the same or different and each of $R_3$ and $R_4$ is independently selected from halogens, haloalkyls, alkyls, and H. According to one embodiment, $R_1$ and $R_2$ are H, and $R_3$ and $R_4$ are either the same or independently selected from halogens, haloalkyls, alkyls, and H. According to another embodiment, $R_1$ and $R_2$ are H, and $R_3$ and $R_4$ are haloalkyls. According to yet another embodiment, $R_1$ and $R_2$ are H, and $R_3$ and $R_4$ are fluoroalkyls.

In addition, the highly flexible polymer may have a glass transition temperature (Tg) of about room temperature or less. Specifically, the highly flexible polymer has a glass transition temperature of about 50° C. or less. According to one embodiment, the highly flexible polymer has a glass transition temperature ranging from about −60° C. to about 50° C. According to another embodiment, the highly flexible polymer has a glass transition temperature ranging from about −60° C. to about −30° C.

When the highly flexible polymer has a glass transition temperature greater than about 50° C., substrate flexibility deteriorates. On the other hand, when the highly flexible polymer has a glass transition temperature of at least about −60° C., substrate flexibility and adherence to the current collector improve.

The highly flexible polymer has a weight average molecular weight ranging from about 10,000 to about 1,000,000. According to one embodiment, the highly flexible polymer has a weight average molecular weight ranging from about 10,000 to about 500,000. When the highly flexible polymer has a weight average molecular weight of less than about 10,000, the binder may dissolve or swell. On the other hand, when the highly flexible polymer has a weight average molecular weight greater than about 1,000,000, it may be difficult to dissolve in a solvent.

The highly flexible polymer may be selected from compounds represented by Formulae 10 to 14 and combinations thereof. A nonlimiting, exemplary polymer satisfying Formula 10 is polypropylene carbonate. Nonlimiting exemplary polymers satisfying Formula 11 include polyethylene oxide and polypropylene oxide. A nonlimiting, exemplary polymer satisfying Formula 12 is polyvinylacetate. A nonlimiting, exemplary polymer satisfying Formula 13 is polyvinylidenefluoride. Nonlimiting, exemplary polymers satisfying Formula 14 include polyvinylidenefluoride-hexafluoropropylene copolymers. However, the highly flexible polymer is not limited thereto and may include any polymer having a low glass transition temperature and satisfying the above conditions.

Formula 10

In Formula 10, $R_5$ is alkylene, and n ranges from 120 to 1000.

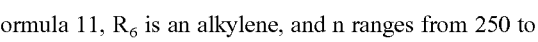

Formula 11

In Formula 11, $R_6$ is an alkylene, and n ranges from 250 to 25,000.

Formula 12

In Formula 12, $R_7$ to $R_{10}$ may be the same or different and each is independently selected from H and alkyls, and n ranges from 120 to 12,000. According to one embodiment, each of $R_7$ to $R_{10}$ is selected from H and $CH_3$.

Formula 13

In Formula 13, $R_{11}$ and $R_{12}$ may be the same or different and each is independently selected from H and alkyls. $X_3$ and $X_4$ may be the same or different and each is independently selected from halogens, and n ranges from 150 to 10,000. According to one embodiment, $X_3$ and $X_4$ are each F.

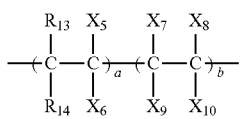

Formula 14

In Formula 14, $R_{13}$ and $R_{14}$ may be the same or different and each is independently selected from H and alkyls. $X_5$ to $X_{10}$ may be the same or different and each is independently selected from halogens, a ranges from 120 to 900, and b ranges from 5100 to 5880. According to one embodiment, $R_{13}$ and $R_{14}$ are each H, and $X_5$ to $X_{10}$ are each F.

In the formulae of the present invention, the alkyl may be a $C_1$ to $C_7$ alkyl, or a $C_2$ to $C_4$ alkyl. The haloalkyl may be a $C_1$ to $C_7$ haloalkyl, or a $C_2$ to $C_4$ haloalkyl. The alkylene may be a $C_1$ to $C_7$ alkylene, a $C_2$ to $C_5$ alkylene, a $C_2$ to $C_4$ alkylene, or a $C_2$ to $C_3$ alkylene.

The negative active material composition may include the negative active material in an amount ranging from about 80 to about 95 wt %. According to another embodiment of the present invention, the negative active material may be included in an amount ranging from about 90 to about 95 wt %. When the negative active material is included in an amount less than about 80 wt %, it becomes difficult to fabricate a high capacity negative electrode. When included in an amount greater than about 95 wt %, there is not enough binder to fabricate an electrode substrate.

In addition, the negative active material composition includes a polyimide precursor compound in an amount ranging from about 4.95 to about 15 wt %. According to another embodiment, the polyimide precursor compound is included in an ranging from about 5 to about 7 wt %. When the polyimide precursor compound is included in an amount less than about 4.95 wt %, there is not enough binder to fabricate an electrode substrate. On the other hand, when the polyimide precursor compound is included in an amount greater than 15 wt %, insufficient negative active material is included in the negative electrode, making it difficult to fabricate negative electrodes having high capacity.

In addition, the negative active material composition may include a highly flexible polymer in an amount ranging from about 0.05 to about 10 wt %. According to another embodiment, the highly flexible polymer may be included in an amount ranging from about 0.1 to about 5 wt %. According to still another embodiment, the highly flexible polymer may be included in an amount ranging from about 0.5 to about 3 wt %. When the highly flexible polymer is included in an amount less than about 0.05 wt %, bending of the electrode substrate is difficult to prevent. On the other hand, when the highly flexible polymer is included in an amount greater than about 10 wt %, volume changes in the negative active material during repeated charge and discharge are difficult to control due to the decreased amount of polyimide.

For the conductive agent, any electrically conductive material may be used so long as it does not cause a chemical change. Nonlimiting examples of suitable conductive agents include natural graphite, artificial graphite, carbon black, acetylene black, ketjen black, carbon fiber, polyphenylene derivatives, and metal powders or metal fibers including copper, nickel, aluminum, silver, and so on.

The above negative active material composition is applied on a current collector and then dried to form a negative active material layer, thereby fabricating a negative electrode. Polyamic acid, which is a polyimide precursor compound, is converted into polyimide during drying and exists as polyimide in the negative active material layer. In other words, the negative active material layer of the present invention includes a negative active material, a polyimide binder, and a highly flexible polymer.

The polyimide may be produced from a polyimide precursor compound produced by a condensation reaction between a first monomer and a second monomer. The first monomer may be selected from compounds represented by Formulae 1 to 4, and the second monomer may be selected from compounds represented by Formulae 5 to 9.

The current collector may be selected copper foil, nickel foil, stainless steel foil, titanium foil, nickel foam, copper foam, polymer substrates coated with a conductive metal, and combinations thereof.

According to another embodiment of the present invention, a rechargeable lithium battery includes the above negative electrode fabricated from the negative active material, a positive electrode and a non-aqueous electrolyte.

The positive electrode includes a positive active material including a lithiated intercalation compound that is capable of reversibly intercalating and deintercalating lithium. Nonlimiting examples of suitable lithiated intercalation compounds include composite oxides including lithium and an element selected from cobalt, manganese, nickel, iron, phosphorus, and combinations thereof. The lithiated intercalation compound may be selected from compounds represented by Formulae 15 to 38.

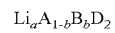

Formula 15

In Formula 15, $0.95 \leq a \leq 1.1$ and $0 \leq b \leq 0.5$.

Formula 16

In Formula 16, $0.95 \leq a \leq 1.1$, $0 \leq b \leq 0.5$, and $0 \leq c \leq 0.05$.

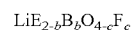

formula 17

In Formula 17, $0 \leq b \leq 0.5$ and $0 \leq c \leq 0.05$.

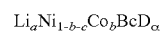

Formula 18

In Formula 18, $0.95 \leq a \leq 1.1$, $0 \leq b \leq 0.5$, $0 \leq c \leq 0.05$, and $0 < \alpha \leq 2$.

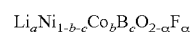

Formula 19

In Formula 19, $0.95 \leq a \leq 1.1$, $0 \leq b \leq 0.5$, $0 \leq c \leq 0.05$, and $0 < \alpha < 2$.

Formula 20

In Formula 20, $0.95 \leq a \leq 1.1$, $0 \leq b \leq 0.5$, $0 \leq c \leq 0.05$, and $0 < \alpha < 2$.

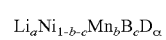

Formula 21

In Formula 21, $0.95 \leq a \leq 1.1$, $0 \leq b \leq 0.5$, $0 \leq c \leq 0.05$, and $0 < \alpha \leq 2$.

Formula 22

In Formula 22, $0.95 \leq a \leq 1.1$, $0 \leq b \leq 0.5$, $0 \leq c \leq 0.05$, and $0 < \alpha < 2$.

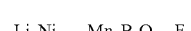

Formula 23

In Formula 23, $0.95 \leq a \leq 1.1$, $0 \leq b \leq 0.5$, $0 \leq c \leq 0.05$, and $0 < \alpha < 2$.

Formula 24

In Formula 24, $0.90 \leq a \leq 1.1$, $0 \leq b \leq 0.9$, $0 \leq c \leq 0.5$, and $0.001 \leq d \leq 0.1$.

Formula 25

In Formula 25, $0.90 \leq a \leq 1.1$, $0 \leq b \leq 0.9$, $0 \leq c \leq 0.5$, $0 \leq d \leq 0.5$, and $0.001 \leq e \leq 0.1$.

$$Li_aNiG_bO_2 \quad \text{Formula 26}$$

In Formula 26, $0.90 \leq a \leq 1.1$ and $0.001 \leq b \leq 0.1$.

$$Li_aCoG_bO_2 \quad \text{Formula 27}$$

In Formula 27, $0.90 \leq a \leq 1.1$ and $0.001 \leq b \leq 0.1$.

$$Li_aMnG_bO_2 \quad \text{Formula 28}$$

In Formula 28, $0.90 \leq a \leq 1.1$ and $0.001 \leq b \leq 0.1$.

$$Li_aMn_2G_bO_4 \quad \text{Formula 29}$$

In Formula 29, $0.90 \leq a \leq 1.1$ and $0.001 \leq b \leq 0.1$.

$$QO_2 \quad \text{Formula 30}$$

$$QS_2 \quad \text{Formula 31}$$

$$LiQS_2 \quad \text{Formula 32}$$

$$V_2O_5 \quad \text{Formula 33}$$

$$LiV_2O_5 \quad \text{Formula 34}$$

$$LiIO_2 \quad \text{Formula 35}$$

$$LiNiVO_4 \quad \text{Formula 36}$$

$$Li_{3-f}J_2(PO_4)_3 \quad \text{Formula 37}$$

In Formula 37, $0 \leq f < 3$.

$$Li_{3-f}Fe_2(PO_4)_3 \quad \text{Formula 38}$$

In Formula 38, $0 \leq f \leq 2$.

In the above formulae, A is selected from Ni, Co, Mn, and combinations thereof. B is selected from Al, Ni, Co, Mn, Cr, Fe, Mg, Sr, V, rare earth elements, and combinations thereof. D is selected from O, F, S, P, and combinations thereof. E is selected from Co, Mn, and combinations thereof. F is selected from F, S, P, and combinations thereof. G is a transition element or a lanthanide element selected from Al, Cr, Mn, Fe, Mg, La, Ce, Sr, V, and combinations thereof. Q is a transition element or a lanthanide element selected from Ti, Mo, Mn, and combinations thereof. I is a transition element or a lanthanide element selected from Cr, V, Fe, Sc, Y, and combinations thereof. J is a transition element or a lanthanide element selected from V, Cr, Mn, Co, Ni, Cu, and combinations thereof.

The positive active material may be selected from elemental sulfur ($S_8$), sulfur-based compounds (such as $Li_2S_n$ ($n \geq 1$), $Li_2S_n$ ($n \geq 1$)) dissolved in a catholyte, organic sulfur compounds, carbon-sulfur polymers (($C_2S_f)_n$: $f=2.5$ to $50$, $n \geq 2$), and combinations thereof.

The positive electrode may be fabricated first preparing a positive active material composition by mixing a positive active material, a binder, and optionally a conductive agent. The composition is then applied on a positive current collector made of a material such as aluminum.

For the conductive agent, any electrically conductive material may be used so long as it does not cause a chemical change. Nonlimiting examples of suitable conductive agents include natural graphite, artificial graphite, carbon black, acetylene black, ketjen black, carbon fiber, polyphenylene derivatives, and metal powders or metal fibers including copper, nickel, aluminum, silver, and so on.

Nonlimiting examples of suitable binders include polyvinyl alcohol, carboxymethyl cellulose, hydroxypropylene cellulose, diacetylene cellulose, polyvinylchloride, polyvinylpyrrolidone, polytetrafluoroethylene, polyvinylidene fluoride, polyethylene, and polypropylene.

The solvent may be N-methylpyrrolidone, but it is not limited thereto.

The non-aqueous electrolyte includes a non-aqueous organic solvent and a lithium salt. The non-aqueous organic solvent acts as a medium for transmitting ions taking part in the electrochemical reaction of the battery. The non-aqueous organic solvent may include a carbonate-based, ester-based, ether-based, ketone-based, alcohol-based, or aprotic solvent. Nonlimiting examples of suitable carbonate-based solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and so on. Nonlimiting examples of suitable ester-based solvents include n-methyl acetate, n-ethyl acetate, n-propyl acetate, dimethylacetate, methylpropionate, ethylpropionate, γ-butyrolactone, decanolide, valerolactone, mevalonolactone, caprolactone, and so on. Nonlimiting examples of suitable ether-based solvents include dibutyl ether, tetraglyme, diglyme, dimethoxyethane, 2-methyltetrahydrofuran, tetrahydrofuran, and so on. Nonlimiting examples of suitable ketone-based solvents include cyclohexanone and so on. Nonlimiting examples of suitable alcohol-based solvents include ethanol, isopropyl alcohol, and so on. Nonlimiting examples of suitable aprotic solvents include nitriles (such as X—CN where X is a C2 to C20 linear, branched, or cyclic hydrocarbon, a double bond, an aromatic ring, or an ether bond), amides (such as dimethylformamide), dioxolanes (such as 1,3-dioxolane), sulfolanes, and so on.

The non-aqueous organic solvent may include a single solvent or a mixture of solvents. When a mixture of solvents is used, the mixture ratio can be controlled in accordance with the desirable battery performance characteristics.

The carbonate-based solvent may include a mixture of cyclic and linear carbonates. When the cyclic carbonate and linear carbonate are mixed in a volume ratio ranging from about 1:1 to about 1:9, and the mixture is used as an electrolyte, the electrolyte performance may be enhanced.

In addition, according to one embodiment of the present invention, the electrolyte may further include mixtures of carbonate-based solvents and aromatic hydrocarbon-based solvents. The carbonate-based solvents and the aromatic hydrocarbon-based solvents are preferably mixed together in a volume ratio ranging from about 1:1 to about 30:1.

The aromatic hydrocarbon-based organic solvent may be represented by Formula 39.

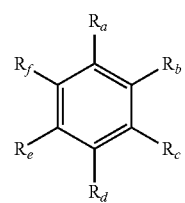

Formula 39

In Formula 39, each of $R_a$ to $R_f$ is independently selected from hydrogen, halogens, C1 to C10 alkyls, haloalkyls, and combinations thereof.

Nonlimiting examples of suitable aromatic hydrocarbon-based organic solvents include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The electrolyte may further include an additive such as vinylene carbonate or fluoroethylene carbonate to improve cycle-life characteristics. The additive may be used in an appropriate amount.

The lithium salt is dissolved in the non-aqueous organic solvent to supply lithium ions in the battery. It enables the basic operation of the rechargeable lithium battery, and facilitates transmission of lithium ions between the positive and negative electrodes. Nonlimiting examples of suitable lithium salts include supporting electrolyte salts selected from $LiPF_6$, $LiBF_4$, $LiSbF_6$, $LiAsF_6$, $LiCF_3SO_3$, $LiN(SO_2C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, lithium bisoxalate borate, and combinations thereof.

The lithium salt may be used at a concentration ranging from about 0.1 to about 2.0M. When the lithium salt concentration is less than about 0.1M, electrolyte performance may deteriorate due to low electrolyte conductivity. When the lithium salt concentration is greater than about 2.0M, lithium ion mobility may be reduced due to increased electrolyte viscosity.

In addition, nonlimiting examples of suitable solid electrolytes include polyethylene oxide polymer electrolytes, polymer electrolytes including at least one polyorganosiloxane or polyoxyalkylene side chain, sulfide electrolytes (such as $Li_2S$—$SiS_2$, $Li_2S$—$GeS_2$, $Li_2S$—$P_2S_5$, $Li_2S$—$B_2S_3$, and the like), and inorganic electrolytes such as $Li_2S$—$SiS_2$—$Li_3PO_4$, $Li_2S$—$SiS_2$—$Li_3SO_4$, and the like.

The rechargeable lithium battery generally includes a separator between the positive electrode and the negative electrode. Nonlimiting examples of suitable separators include polyethylene, polypropylene, and polyvinylidene fluoride, and multilayers thereof (such as polyethylene/polypropylene bilayered separators, polyethylene/polypropylene/polyethylene three-layered separators, and polypropylene/polyethylene/polypropylene three-layered separators).

Figure 2:
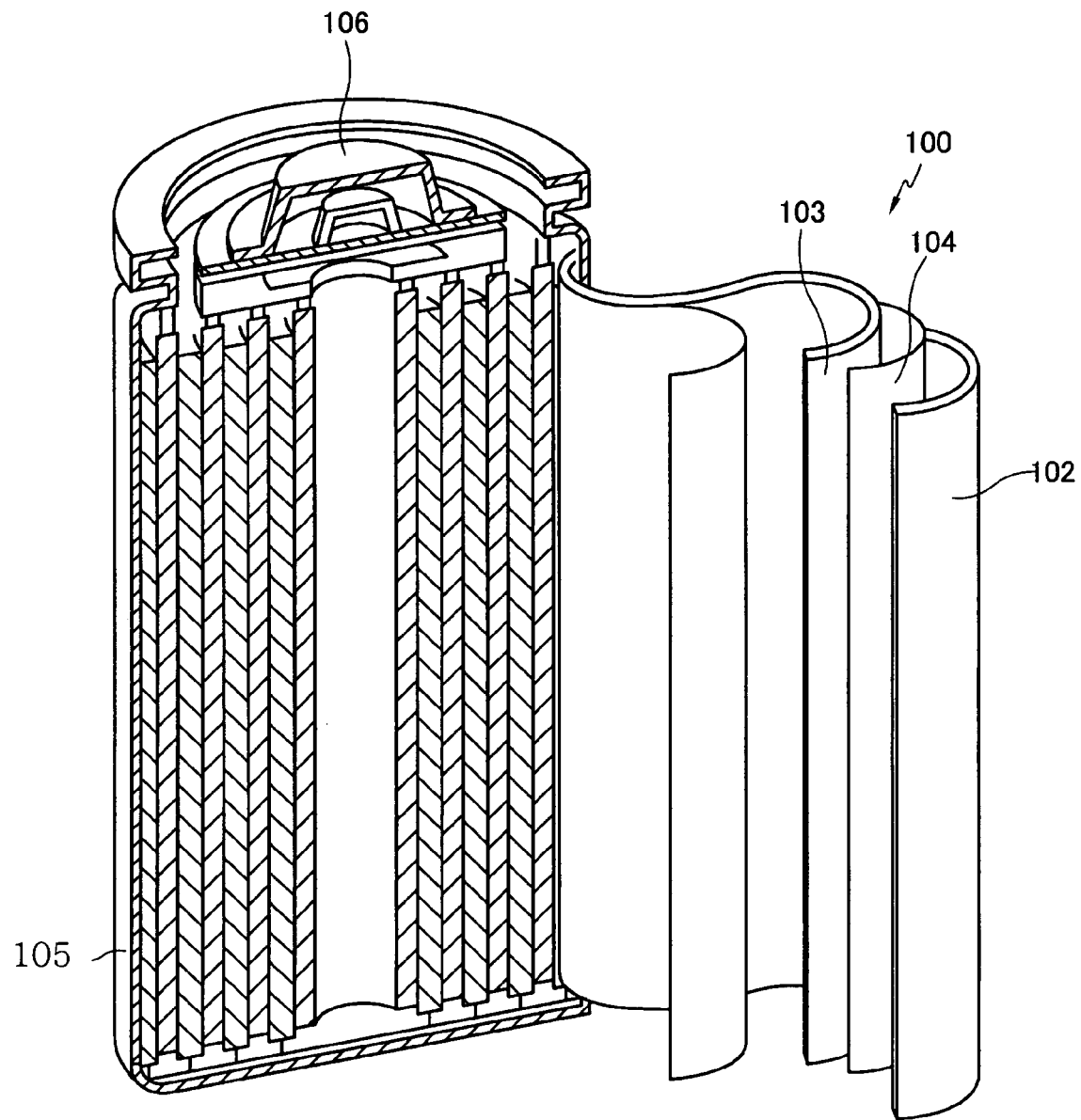
FIG. 2 is a schematic cross-sectional view of a rechargeable lithium battery according to one embodiment of the present invention.

FIG. 2 illustrates a rechargeable lithium battery having the above-mentioned structure according to one embodiment of the present invention. As shown in FIG. 2, a cylindrical lithium ion cell 100 includes a negative electrode 102, a positive electrode 103, a separator 104 between the negative electrode 102 and the positive electrode 103, an electrolyte impregnating the separator 104, a battery case 105, and a sealing member 106 sealing the battery case 105. The rechargeable lithium battery according to the present embodiment is not limited to the above-mentioned shape, and may be shaped into a prismatic shape, a pouch, and so on.

The following examples illustrate certain embodiments of the present invention. These examples are presented for illustrative purposes only and are not intended to limit the scope of the present invention.

EXAMPLE 1

9.5 wt % of a polyamic acid, 85 wt % of a silicon negative active material, 0.5 wt % of a polyvinylidenefluoride highly flexible polymer, and 5 wt % of a carbon black conductive agent were mixed in an N-methylpyrrolidone solvent to prepare a negative active material slurry. The negative active material slurry was coated on a copper current collector and dried at 120° C. to prepare a negative electrode. The negative electrode was loaded at 2.7 mg/cm². Accordingly, the negative electrode included a negative active material layer including a polyimide binder, which was horizontally coated on a flat copper current collector.

EXAMPLE 2

A negative electrode was prepared as in Example 1, except that a negative active material layer was loaded at 3.9 mg/cm².

EXAMPLE 3

A negative electrode was prepared as in Example 1, except that a negative active material layer was loaded at 4.2 mg/cm².

EXAMPLE 4

A negative electrode was prepared as in Example 2, except that polyvinylidenefluoride was replaced with polyvinylacetate.

EXAMPLE 5

A negative electrode was prepared as in Example 3, except that polyvinylidenefluoride was replaced with a polyvinylidenefluoride-hexafluoropropylene copolymer.

EXAMPLE 6

A negative electrode was prepared as in Example 2, except that polyvinylidenefluoride was replaced with polyethyleneoxide.

EXAMPLE 7

A negative electrode was prepared as in Example 1, except that polyvinylidenefluoride was included in an amount of 0.1 wt %.

EXAMPLE 8

A negative electrode was prepared as in Example 1, except that polyvinylidenefluoride was included in an amount of 0.3 wt %.

EXAMPLE 9

A negative electrode was prepared as in Example 1, except that polyvinylidenefluoride was included in an amount of 3 wt %.

EXAMPLE 10

A negative electrode was prepared as in Example 1, except that polyvinylidenefluoride was included in an amount of 7 wt %.

EXAMPLE 11

A negative electrode was prepared as in Example 1, except that polyvinylidenefluoride was included in an amount of 10 wt %.

COMPARATIVE EXAMPLE 1

10 wt % of a polyamic acid, 85 wt % of a silicon negative active material, and 5 wt % of a carbon black conductive agent were mixed in an N-methylpyrrolidone solvent to prepare a negative active material slurry. The negative active material slurry was coated on a copper current collector and dried at 120° C. to prepare a negative electrode. The negative electrode was loaded at 2.7 mg/cm².

COMPARATIVE EXAMPLE 2

A negative electrode was prepared as in Comparative Example 1, except that the loading amount was 3.9 mg/cm².

COMPARATIVE EXAMPLE 3

A negative electrode was prepared as in Comparative Example 1, except that the loading amount was 4.2 mg/cm².
Photographs of a Bent Negative Electrode Depending on Loading Amounts The negative electrodes prepared according to Examples 1 to 3 are respectively shown in FIGS. 3, 4, and 5.

Figure 6:
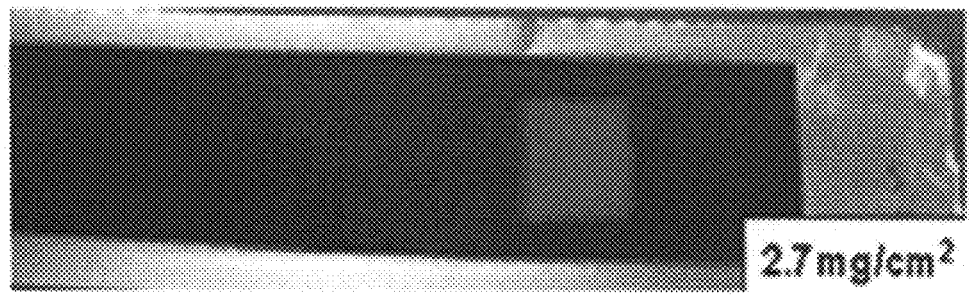
FIG. 6 is a photograph of the negative electrode prepared according to Comparative Example 1.
Figure 7:
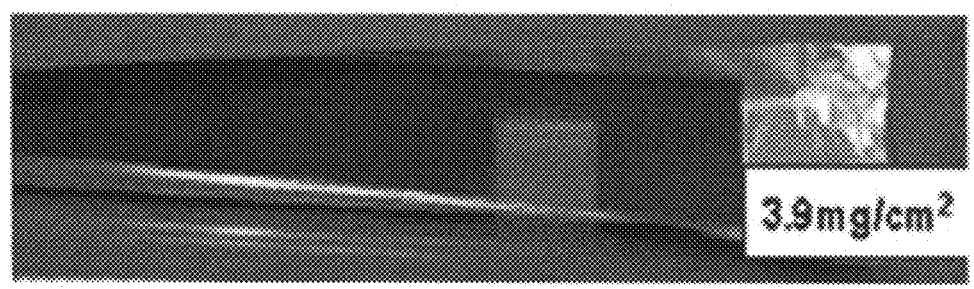
FIG. 7 is a photograph of the negative electrode prepared according to Comparative Example 2.
Figure 8:
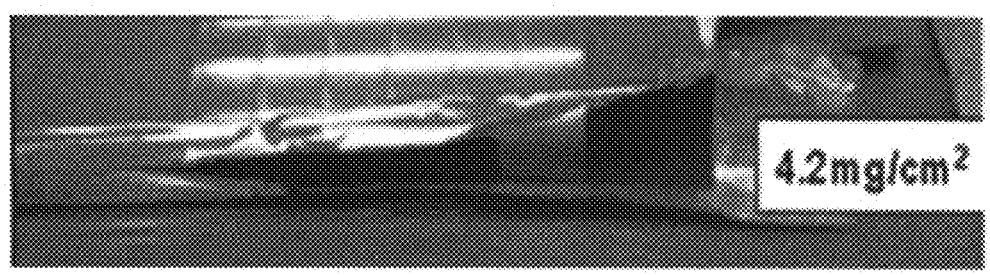
FIG. 8 is a photograph of the negative electrode prepared according to Comparative Example 3.

FIGS. 6, 7, and 8 are photographs of the negative electrodes prepared according to Comparative Examples 1 to 3.

Figure 3:
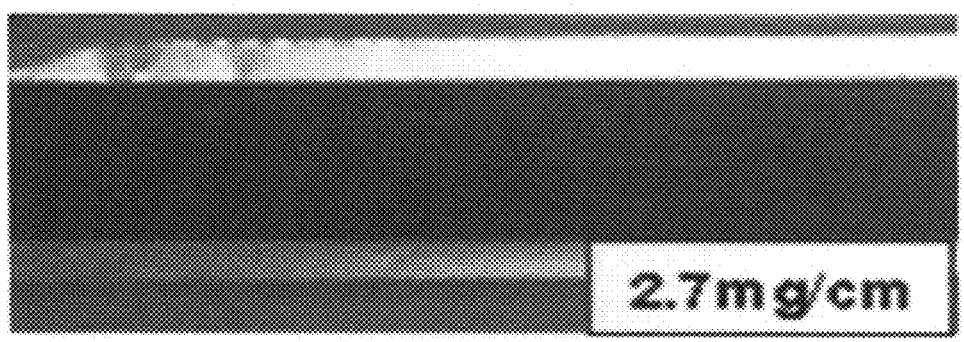
FIG. 3 is a photograph of the negative electrode prepared according to Example 1.
Figure 4:
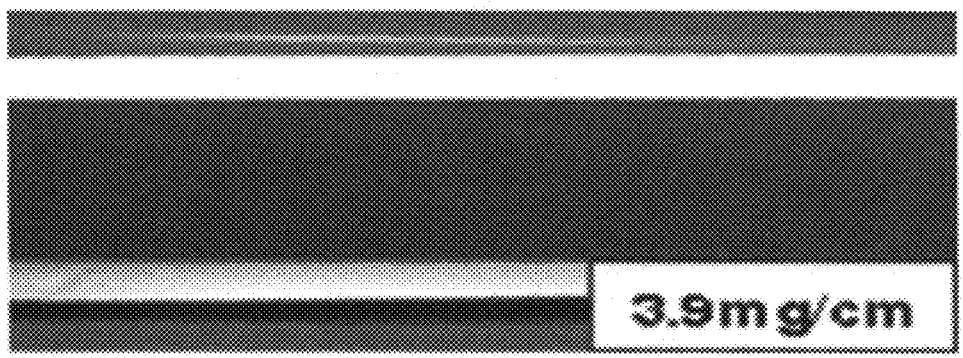
FIG. 4 is a photograph of the negative electrode prepared according to Example 2.
Figure 5:
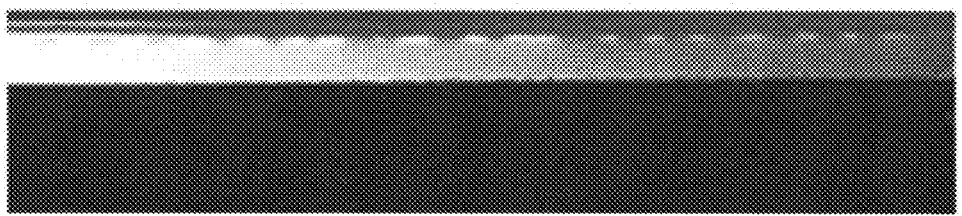
FIG. 5 is a photograph of the negative electrode prepared according to Example 3.

As shown in FIGS. 3 to 5, the negative electrodes having negative active material layers including a highly flexible polymer were not bent regardless of the amount of negative active material slurry loaded on the copper current collector.

On the contrary, as shown in FIGS. 6 to 8, the negative electrodes having negative active materials not including a highly flexible polymer were more severely bent as the amount of negative active material slurry loaded on the copper current collector increased.

Result of Capacity and Cycle-Life Characteristics 18650-type cylindrical batteries having diameters of 18 mm and heights of 65 mm were fabricated using the negative electrodes prepared according to Examples 1 to 3 and Comparative Examples 1 to 3, a positive electrode including a lithium cobalt oxide positive active material, and an electrolyte prepared by dissolving 1M of $LiPF_6$ in an organic solvent including a mixture of ethylenecarbonate and diethylcarbonate in a volume ratio of 3:7. The cylindrical batteries were charged and discharged for 100 cycles at a 0.5 C rate. Their discharge capacity retentions at 10 cycles, 50 cycles, and 100 cycles are shown in Table 1.

TABLE 1

| | Discharge Capacity Retention (%) | | |
|---|---|---|---|
| | 10 cycles | 50 cycles | 100 cycles |
| Example 1 | 91.0% | 85.3% | 80.2% |
| Example 2 | 89.8% | 83.9% | 77.5% |
| Example 3 | 88.0% | 81.4% | 74.8% |
| Comparative Example 1 | 87.5% | 81.7% | 74.5% |
| Comparative Example 2 | The substrates were bent so that substrates coated on both sides could not be made. Therefore, cells were not fabricated. | | |
| Comparative Example 3 | | | |

As shown in Table 1, the battery prepared with the negative active material composition of Example 3 (loaded at 4.2 mg/cm²) turned out to have a similar capacity retention to that of the battery prepared with the negative active material composition of Comparative Example 1 (loaded at 2.7 mg/cm² and not including the highly flexible polymer) even at the 100$^{th}$ cycle. Therefore, the battery including the negative active material composition of Example 3 maintains capacity retention even if the negative active material is increasingly loaded. Accordingly, the battery including the negative active material composition of Example 3 has high capacity.

Therefore, the inventive negative active material compositions for rechargeable lithium batteries can prevent electrode substrates from bending and provide the substrates with flexibility, thereby improving capacity and cycle-life characteristics of the batteries.

While the present invention has been illustrated and described with reference to certain exemplary embodiments, it will be understood by those of ordinary skill in the art that various changes and modifications may be made to the described embodiments without departing from the spirit and scope of the present invention as defined by the following claims.

What is claimed is:

1. A negative active material composition for a rechargeable lithium battery, comprising:
   a negative active material selected from the group consisting of Si, SiO, and $SiO_x$, wherein $0<x<2$;
   4.95 to about 15 wt % of a polyamic acid; and
   about 0.05 to about 3 wt % of a flexible polymer, wherein the flexible polymer is selected from the group consisting of polypropylene carbonate, polyethylene oxide, polypropylene oxide, polyvinylacetate, polyvinylidenefluoride, a polyvinylidene fluoride hexafluoropropylene copolymer, and combinations thereof.

2. The negative active material composition of claim 1, wherein the flexible polymer has a glass transition temperature of less than about 50° C.

3. The negative active material composition of claim 1, wherein the flexible polymer has a weight average molecular weight ranging from about 10,000 to about 1,000,000.

4. A negative electrode comprising:
   a current collector; and
   a negative active material layer on the current collector, the negative active material layer comprising a negative active material selected from the group consisting of Si, SiO, and $SiO_x$, wherein $0<x<2$, 4.95 to about 15 wt % of a polyamic acid, and about 0.05 to about 3 wt % of a flexible polymer, wherein the flexible polymer is selected from the group consisting of polypropylene carbonate, polyethylene oxide, polypropylene oxide, polyvinylacetate, polyvinylidenefluoride, a polyvinylidene fluoride hexafluoropropylene copolymer, and combinations thereof, the negative active material layer being loaded at 3.9 mg/cm² to 4.2 mg/cm².

5. The negative electrode of claim 4, wherein the flexible polymer has a glass transition temperature of less than about 50° C.

6. The negative electrode of claim 4, wherein the flexible polymer has a weight average molecular weight ranging from about 10,000 to about 1,000,000.

7. A rechargeable lithium battery comprising:
   a negative electrode comprising a negative active material layer on a current collector, the negative active material layer comprising a negative active material selected from the group consisting of Si, SiO, and $SiO_x$, wherein $0<x<2$, 4.95 to about 15 wt % of a polyamic acid; and about 0.05 to about 3 wt % of a flexible polymer, wherein the flexible polymer is selected from the group consisting of polypropylene carbonate, polyethylene oxide, polypropylene oxide, polyvinylacetate, polyvinylidenefluoride, a polyvinylidene fluoride hexafluoropropylene copolymer, and combinations thereof, the negative active material layer being loaded at 3.9 mg/cm$^2$ to 4.2 mg/cm$^2$; and a positive electrode comprising a positive active material capable of reversibly intercalating and deintercalating lithium ions.

8. The rechargeable lithium battery of claim 7, wherein the flexible polymer has a glass transition temperature of less than about 50° C.

9. The rechargeable lithium battery of claim 7, wherein the flexible polymer has a weight average molecular weight ranging from about 10,000 to 1,000,000.

* * * * *